United States Patent

[11] 3,610,340

[72] Inventors Stanley O. Hutchison
 Bakersfield;
 John C. McKinnell, Taft; Glen W.
 Anderson, Oildale, all of Calif.
[21] Appl. No. 839,623
[22] Filed July 7, 1969
[45] Patented Oct. 5, 1971
[73] Assignee Chevron Research Company
 San Francisco, Calif.
 Continuation-in-part of application Ser. No.
 704,832, Feb. 12, 1968, now Patent No.
 3,463,231. This application July 7, 1969,
 Ser. No. 839,623, Apr. 12, 1968, Pat. No.
 3,486,560.

[54] AQUEOUS FOAMED WELL CIRCULATION
 FLUIDS CONTAINING A BASE COMPONENT AND
 THEIR USE IN THE TREATMENT OF WELLS
 16 Claims, No Drawings
[52] U.S. Cl....................................................... 166/311,
 252/8.55, 175/69
[51] Int. Cl........................................................ E21b 21/00,
 E21b 21/04
[50] Field of Search........................................... 166/309,
 311, 312, 305, 310, 314, 273-275, 282, 258;
 175/69, 71; 252/8.5, 8.55 B

[56] References Cited
 UNITED STATES PATENTS

| 3,097,691 | 7/1963 | Smith............................ | 175/71 UX |
| 3,130,798 | 4/1964 | Schramm et al. ............ | 175/69 |
| 3,303,896 | 2/1967 | Tillotson et al. .............. | 175/69 |
| 3,313,362 | 4/1967 | Schneider..................... | 175/71 |
| 3,330,346 | 7/1967 | Jacobs et al. ................. | 166/274 X |

Primary Examiner—Stephen J. Novosad
Attorneys—A. L. Snow, F. E. Johnston, John Stoner, Jr. and D. L. Hagmann ABSTRACT: Preformed well circulation foams containing a base component are used for the treating of wells, particularly for the neutralization of acid in oil wells.

AQUEOUS FOAMED WELL CIRCULATION FLUIDS CONTAINING A BASE COMPONENT AND THEIR USE IN THE TREATMENT OF WELLS

CROSS REFERENCES TO RELATED APPLICATIONS

This application is a continuation-in-part of our copending applications, Ser. No. 704,832 filed Feb. 12, 1968, and now U.S. Pat. No. 3,463,231, and Ser. No. 720,977 filed Apr. 12, 1968, now U.S. Pat. No. 3,486,560, which disclose improved methods for the circulation of foamed fluids in wells.

FIELD OF INVENTION

This invention relates to aqueous well circulation foams containing a base component and to the method for the use of these foams for the treatment of wells, particularly of oil wells for the neutralization of noxious acidic effluents such as hydrogen sulfide, carbonyl sulfide, and the like, and for the cleaning of oil wells.

In the recovery of minerals such as petroleum from subterranean formations or voids by means of a well, acidic noxious gases such as hydrogen sulfide, carbonyl sulfide, and the like, often are found associated with the light gases which may be concurrently emitted from the well. Special measures are required and generally taken to keep the surrounding well environment as well as the atmosphere, in general, free of these materials since their effect upon many forms of life in particular can be lethal. A particularly difficult situation is often encountered when a wellhead and associated pipe strings must be open to the atmosphere during drilling or maintenance and workmen are employed in the vicinity of the well.

In the recovery of minerals from subterranean formations or voids, as noted above, strong mineral acids are often introduced into a well for the purpose of stimulating the producing horizon in the well or to assist in cleaning of the well. Generally these acids should be removed from the well because of their corrosive effects upon pipe strings, metal apparatus, and the like, employed in the operation of the well. It is known to wash an acidified well with aqueous caustic solutions but such means, while useful, have certain drawbacks, including the necessity for the removal of the aqueous caustic solution from the well, the penetration of the producing formation by the caustic solution under a substantial pressurehead, and the like.

INVENTION DESCRIPTION

It has now been found that an aqueous preformed well circulation foam containing a base component in an amount at least as much as 0.005 parts per 100 parts of foam (weight) or sufficient to yield a foam pH of at least eight may be introduced into a well and employed to neutralize acid in the well bore and in the effluent vapor stream of the well. Strong alkali metal bases, ammonium carbonate and bicarbonate and lower alkyl amines of the formula $RR_2'N$ in which R is a lower alkyl group and R' is a lower alkyl group or hydrogen are bases useful as components of acid neutralizing foams, e.g., preformed foams having a base component.

Noxious acidic materials are effectively scrubbed from the effluent gas stream of a well by means of the subject preformed well circulation foam containing a base component. Similarly, acidified solutions of mineral acids present in a well bore may be removed from the well and residual acid in the well bore neutralized by the circulation of these foams. The presence of a base component in a well circulation foam is also found to be an effective means for the improvement of the cleaning ability of the subject foams in their circulation in an oil well.

Surprisingly, the flow characteristics of preformed well circulation foams which contain a base component appear to undergo relatively minor, if any, adverse effects in their use as an acid neutralization or cleaning means in a well. The resulting salts, oily emulsions and loosened solids, such as sand, etc., are readily accommodated by the basic foam and carried along during circulation.

By an alkali metal base, as used herein, is meant by definition an alkali metal compound having a base strength (acid-base) at least equal to sodium formate.

By a lower alkyl, as used herein, is meant by definition an alkyl group having a carbon atom content of less than 5 carbon atoms.

By foam circulation, as used herein, is meant by definition the movement of foam from place to place.

By an aqueous well circulation foam, as used herein, is meant by definition a foam produced from a gas and a foamable aqueous solution containing in parts by weight per 100 parts of the solution from about 0.005 to 5 parts of an organic foaming agent. Preferably, the foam has a gas-to-liquid volume quotient, standard cubic feet per gallon respectively in the range from about 3 to 50.

By a preformed foam, as used herein, is meant a foam which is generated out of contact with the solids and/or liquids naturally encountered in a well bore, i.e., a foam formed out of contact with contaminants associated with a well bore environment, including cuttings, oil, brine, and the like.

The aqueous foams of the present invention are preferably circulated or introduced into a well at velocities less than about 600 feet per minute.

In a preferred embodiment of the invention an aqueous gas-in-liquid foam is prepared by introducing water, a detergent concentrate, and sodium hydroxide solution into a foam generation unit at rates sufficient to produce in the unit a foamable solution which contains in parts by weight for each 100 parts thereof about 0.1–1 part of an organic foaming agent; for example, the sodium salt of a linear $C_{12}$–$C_{16}$ alkylbenzene sulfonic acid mixture, and about 0.1 part of the sodium hydroxide. The foamable solution and a gas, for example, air, are mixed in the foam generator wherein a foam having a gas-to-liquid volume quotient (standard cubic feet per gallon) in the range 5–20 is generated and passed into the well under a pressure sufficient to circulate the foam.

The amount of the base component which should be used in preparing a base-containing foam varies depending upon the particular base or mixture of bases and the neutralization to be accomplished. In general, the use in parts by weight of an amount of the base in the range 0.005 to 5 parts per 100 parts of foam results in a satisfactory foam. Alternatively, at least sufficient of the base should be added to the foamable solution to yield a pH of 8. Where a larger acid neutralization capacity for the foam is needed, larger relative amounts of the base may be used; for example, as much as 10 parts of base per 100 parts of foam.

Representative bases include the alkali metal hydroxides, carbonates and bicarbonates; alkali metal salts of weak organic acids (formate, acetate, and the like); alkali metal salts of weak inorganic acids (silicate, phosphate and the like; i.e., acids whose aqueous salt solutions have a pH greater than about 8); ammonium carbonate, and bicarbonate; and amines such as methylamine, dimethylamine, trimethylamine, ethylamine, diethylamine, triethylamine, ethylmethylamine, butylamine, and the like.

The alkali metal hydroxides are preferred for their strong base characteristics.

The carbonates are particularly useful and preferred:
1. in that upon neutralization with acid they yield carbon dioxide in situ; and
2. carbon dioxide generated in situ as behind scale, solids, etc., rapidly sets up a pressure differential which is often useful for dislodging the scale, etc.

Lower alkyl amines are useful and preferred as a substitute for ammonia, partial or complete, where exhaustion of the more volatile ammonia gas to the atmosphere is undesirable as from a foam return discharge sump and the like.

Gas-in-liquid foam generation is well known in the art (see, for example, Encyclopedia of Chemical Technology, Volume 6, Interscience Encyclopedia, Inc., New York (1951); U.S. 3,212,762.) Large volumes and a ready supply of foam are required for the practice of the instant invention. As eductor or venturi-type nozzle arrangement followed by downstream in-line mixing baffles or steel wool or the like, has been found to yield satisfactory gas-in-liquid foams and is the preferred mode for use herein.

In the production of the subject foams a gas such as air, nitrogen, methane, natural gas, inert exhaust gas, or carbon dioxide and the like is used. Air is preferred where natural gas pressures are low; at high formation pressures a relatively inert gas, i.e., nitrogen, air and carbon dioxide or carbon dioxide, is preferred.

Organic foaming agents are in general satisfactory for use in the instant invention provided that the agent has a Ross-Miles initial foam height of at least 10 centimeters and a cumulative foam height of at least 30 centimeters [cf. Ross J., and Miles G.D., "An Apparatus for Comparison of Foaming Properties of Soaps and Detergents," Oil and Soap, Volume 18, 1941, Pages 99-102; ASTN D 1173-53 (1965)] at the concentration being used.

By a Ross-Miles initial foam height, as used herein, is meant the initial or 0-time foam height as obtained in the standard Ross-Miles foam analysis method.

By a cumulative foam height, as used herein, is meant the sum of the foam heights at the 0-, 1-, 2-, 5- and 10-minute intervals as obtained in the Ross-Miles method.

Useful foaming agent concentrations vary depending upon the particular agent being used. In general, in parts by weight per 100 parts of foamable solution, the amount of the agent desirably used is in the range from about 0.005 to 1. Larger amounts of foaming agent can also be used, but such as is relatively inefficient in view of the cost, particularly at concentrations in excess of about 2-5 parts per 100.

By organic foaming agents is meant organic compounds, salts of organic compounds, and mixtures thereof, whose aqueous solutions foam when air is bubbled through the solution. These agents are known to the art as surface active compounds and are classified as anionic, cationic, nonionic and amphoteric agents (see, for example, "Detergents and Emulsifiers," 1966 Annual, John W. McCutcheon, Inc., also Surface ACtive Agents, Volumes 1 and 2, A. M. Schwartz, J. W. Perry and J. Berch, Interscience Publishers, Inc., New York (1949 and 1958).

In general, for a given foaming agent, there is an optimum concentration range (roughly in the range where the solution contains from about 0.1 to 0.5 part per 100) at which the agent yields its most elastic foam. In this range, the change of solution surface tension per change in foaming agent concentration is relatively large. This range is also known as the reversible surface tension range. Foamable solutions having foaming agent concentrations which are intermediate concentrations within this range yield, in general, the most satisfactory foamed well circulation fluids.

Preferred well circulation foams have, in general, a gas-to-liquid volume quotient (standard cubic feet per gallon, respectively) in the range from about 3 to 50, respectively, more preferably in the range from about 5 to 20. For extra heavy duty usage, foams having a quotient as low as 1-2 may be satisfactory. These foams have a relatively high density and tend to be more difficult to circulate, i.e., have a higher work requirement. On the other hand, with increasing gas-to-liquid quotients, bubble sizes are relatively larger and foam characteristics, including stability under conditions of flow in a well, become progressively poorer.

Anionic foaming agents are preferred for use in the preparation of the subject basic foamed well circulation fluids. Of these agents, the surfactants of the formula R(0)$_n$SO$_3$M in which R represents an oleophilic radical, M represents the ammonium or an alkali metal cation and $n$ is zero or 1, are preferred for use herein. They yield foams which are especially useful basic well circulation fluids. The oleophilic radical R may be a hydrocarbon radical containing from about 8 to 20 carbon atoms or a radical of the formula R'(OCH$_2$CH)$_m$ in which R' is an oleophilic hydrocarbon radical containing from about 8 to 18 carbon atoms and $m$ is a whole number in the range from 1 to about 15, preferably 3 to 10, inclusive.

Hydrocarbon radicals in general having the specified carbon atom content are contemplated as groups R or R' in the formulas above. Representative classes include such radicals as alkyl, cycloalkyl, aryl, alkylaryl, alkenyl, alkylcycloakyl, alkenylcycloalkyl, alkenylaryl, arylalkenyl, and the like radicals. Preferred hydrocarbon radicals are the aliphatic or alkylaryl hydrocarbon radicals.

Representative preferred classes of foaming agents useful in the instant invention include the alkylbenzene sulfonates, the paraffin sulfonates, the alpha-olefin sulfonates, the internal olefin sulfonates, and the like, i.e., where $n$ of the above formula is zero and the foaming agent has the formula RSO$_3$M and R and M are define as stated above. Of these foaming agents, the class of alpha-olefin sulfonates are particularly preferred. These materials are a complex mixture of compounds which yield basic foams which are especially effective well circulation fluids. In general, they yield foams which are dense and made up of relatively uniform small bubbles. The small bubble sizing appears to promote foam stability and to impart to them excellent circulation characteristics.

Similar to the alpha-olefin sulfonates, the sulfonates of the formula R'(OCH$_2$CH$_2$)$_M$OSO$_{3M}$ wherein R', $m$ and M are as noted above, for example $n$-C$_{18}$H$_{37}$(OCH$_2$CH$_2$)$_5$OSO$_3$NH$_4$, yield exceptional well circulation foams containing a base component.

Other representative sulfonates are those of the formula R'(OCH$_2$CH)$_m$SO$_3$M wherein R', $m$ and M are as noted above, for example $n$-C$_{16}$H$_{33}$(OCH$_2$CH$_2$)$_4$SO$_3$NH$_4$.

By definition as used herein, by the term "alpha olefin sulfonate" is meant the product mixture obtained at a reaction temperature in the range from about 10° to 60° C. from the reaction of an alpha-olefin, RCH=CH$_2$, where R is an alkyl radical of the C$_8$-C$_{18}$ range, with sulfur trioxide dilute by air with the product being neutralized and hydrolyzed using aqueous sodium hydroxide or an equivalent strong mineral base at a temperature in the range from about 50° to 130° C. (See, for example "Alpha-Olefins in the Surfactant Industry" by T. H. Liddicoet, the American Oil Chemists Society, Nov., 1963, Volume 40, No. 11, pp. 631-636, and "Alpha Olefin Sulfonates from a Commercial SO$_3$-Air Reactor" by D. M. Marquis et al., ibid, Volume 43, No. 11, pp. 607-614 (1966)).

The use of molecular mixtures of a given foaming agent species as well as individual molecular species of the aforedescribed organic foaming agents is contemplated. Mixtures which contain two or more foaming agent species are also contemplated. In particular, of the mixtures of foaming agent species, the alkylbenzene sulfonates and alpha-olefin sulfonates are preferred for use in the production of basic foams in which each foaming agent species is in turn a molecular mixture, for example, a C$_{10}$-C$_{15}$-alkylbenzene sulfonate molecular mixture plus a C$_{14}$-C$_{18}$ alpha-olefin sulfonate mixture.

Representative foaming agents useful in the practice of the subject invention include sodium, potassium and ammonium polypropylene tetramer benzene sulfonate, polypropylene pentamer benzene sulfonate, n-dodecylbenzene sulfonate, s-tetradecylbenzene sulfonate, s-hexadecylbenzene sulfonate, and the like; lauryl sulfate, octadecyl sulfate, $n$-C$_{10}$-H$_{21}$SO$_3$$^1$ $n$-C$_{10}$-C$_{15}$SO$_3$$^1$ mixtures; C$_{12}$-C$_{15}$-alpha-olefin sulfonate mixtures, 1-dodecene-1-sulfonate, tetradecane-2-sulfonate; $n$-C$_8$H$_{15}$(OCH$_2$CH$_{23}$OSO$_3$$^1$; laurate dodecanoate, and the like foaming agents.

Other representative foaming agents useful in the instant process include: ethanolated alkyl guanidine-amine complex, isopropyl naphthalene sodium sulfonate, dioctyl sodium sulfosuccinate, dicoco diethyl ammonium chloride, tallow trimethyl ammonium chloride, fatty alcohol alkylolamine sulfate, condensation of hydrogenated tallow amide and ethylene oxide, modified fatty alklolamide, ethylene cyclomido 1-lauryl,2-hydroxy ethylene Na alcoholate, methylene Na carboxylate, lauric diethanolamide, fatty acid alkanolamide, condensation product of ethylene oxide with propylene glycol, C-cetyl betaine, polyoxyethylene alkyl aryl ether, sodium alkyl naphthalene sulfonate, alkyl aryl polyether alcohol, sorbitan monolaurate, sorbitan monopalmitate, sorbitan trioleate, polyoxyethylene sorbitan tristearate, polyoxyethylene sorbitan monooleate, octylphenoxyethanols, dioctyl sodium sulfosuccinate, modified phthalic glycerol alkyl resin, isoctyl phenyl polyethoxy ethanol (about 5 ethoxy groups per molecule).

The following examples further illustrate the invention.

EXAMPLE 1

In the drilling of the well designated 41C in the Taft, California area (2-2A-1C) a foam containing an alkali metal base component, sodium hydroxide, was circulated for the removal of cuttings and to maintain the well bore and effluent stream nonacidic. The foamable solution was preferred by the addition of 2 pounds of the base to a barrel of water and of a commercially available foaming agent. For each 100 parts of the solution, 0.1–1 part (weight) of agent was used. The basic foam was generated using carbon dioxide gas and this foam was an effective well circulation fluid useful for the removal of the cuttings and for maintaining the well and effluent stream nonacidic.

EXAMPLE 2

Another oil well in the Taft, California area which had been produced from an unconsolidated sand formation was shunt down for a period of about 3 years because of excessive sand flow into the well. Concurrent with the oil production of the well, when being produced, there was a large flow of hydrogen sulfide gas. Workmen in the area, when the well was being serviced, required suitable protection such as gas masks. This well was cleaned of sand, etc. by the use of an aqueous ammoniated well circulation foam. The basic foam effectively neutralized the hydrogen sulfide in the effluent stream and eliminated the safety hazard to the operating personnel, which would otherwise have been experienced from the noxious gas. When an alkali metal base component is substituted for the ammonium hydroxide, similar useful results obtain.

EXAMPLE 3

In a laboratory foam circulation unit simulating a well, a foam containing sodium silicate as the base component was tested at volume quotients, standard cubic feet of air per gallon of foamable solution, in the quotient range 13–20. The foam had excellent stability and carrier characteristics. In the preparation of the foam, the foamable solution has a 1 percent volume concentration of a sodium $n\text{-}C_{10}\text{-}C_{15}$-alkylbenzene sulfonate and contained sufficient sodium silicate to yield a solution pH of 11.0. When sodium or potassium hydroxide is substituted for all or part of the sodium silicate, the pH of the foam is about 14.

Potassium, lithium and the other alkali metal hydroxides, carbonates and bicarbonates also yield similar useful results as base components of a well circulation fluid. While the above noted amines are relatively weaker with respect to base strength, these also yield satisfactory and useful foams having acid neutralizing abilities.

We claim:

1. The method of treating a well which comprises incorporating a base into a preformed well circulation foam and introducing the resulting basic foam into the well, said base being present in the foam in an amount of at least about 0.005 parts per 100 parts of the foam, said base being selected from the group consisting of strong alkali metal bases, ammonium carbonate, ammonium bicarbonate and lower alkylamines of the formula $RR_2'N$ wherein R is a lower alkyl group and R' is the same or different and is selected from the group consisting of lower alkyl and hydrogen, the foregoing parts being by weight.

2. The method as in claim 1 further characterized in that said base is present in an amount in the range from about 0.005 to 10 parts per 100 parts of foam.

3. The method as in claim 2 further characterized in that said treatment comprises neutralizing acid in the well.

4. The method as in claim 3 further characterized in that hydrogen sulfide is neutralized by the treatment.

5. The method as in claim 2 further characterized in that said treatment comprises cleaning the well.

6. The method as in claim 2 in that said base is an alkali metal hydroxide.

7. The method as in claim 2 further characterized in that said base is selected from the group consisting of alkali metal carbonates, ammonium carbonate and mixture thereof.

8. The method as in claim 2 further characterized in that said base is a lower alkyl amine of the formula $RR_2'N$ wherein R is a lower alkyl group and the R' are the same or different and are selected from the group consisting of hydrogen and lower alkyls.

9. The method as in claim 2 further characterized in that the base is sodium hydroxide.

10. The method as in claim 2 further characterized in that the base is sodium silicate.

11. The method as in claim 2 further characterized in that the amount of base is sufficient to yield a pH of the foam of at least eight.

12. The aqueous preformed well circulation foam free of natural contaminants encountered in a well bore and containing for each 100 parts thereof an amount of a base in the range from about 0.005 parts to 10 parts, wherein said base is selected from the group consisting of strong alkali metal bases, ammonium carbonate, ammonium bicarbonate and lower alkyl amines of the formula $RR_2'N$ wherein R is a lower alkyl group and R' is the same or different and is selected from the group consisting of lower alkyls and hydrogen, the foregoing parts being by weight.

13. The composition as in claim 12 further characterized in that said base is sodium hydroxide.

14. The composition as in claim 12 further characterized in that said base is sodium carbonate.

15. The composition as in claim 12 further characterized in that said base is sodium silicate.

16. In the circulation of a preformed foam in a well wherein the foam is an aqueous gas-in-liquid foam obtained from a gas and an aqueous solution containing a foaming agent and is formed out of contact with natural contaminants encountered in a well bore, the improvement which comprises adding to the solution an amount of a base in the range from about 0.005 to 10 parts of the solution, said base being selected from the group consisting of strong alkali metal bases, ammonium carbonate, ammonium bicarbonate, and lower alkylamines of the formula $RR_2'N$ wherein R is a lower alkyl group and R' is the same or different and is selected from the group consisting of lower alkyls and hydrogen, the foregoing parts being by weight.

PO-1050
(5/69)

UNITED STATES PATENT OFFICE
CERTIFICATE OF CORRECTION

Patent No. 3,610,340      Dated October 5, 1971

Inventor(s) Stanley O. Hutchison, John C. McKinnell, and Glen W. Anderson

It is certified that error appears in the above-identified patent and that said Letters Patent are hereby corrected as shown below:

Col. 2, line 75, "As eductor" should read --An eductor--.
Col. 3, line 30, "such as" should read --such use--.
Col. 3, line 74, "R'(OCH$_2$CH)$_m$" should read --R'(OCH$_2$CH$_2$)$_m$--.
Col. 4, line 6, "alkylcycloakyl" should read --alkylcycloalkyl--.
Col. 4, line 15, "define as" should read --defined as--.
Col. 4, line 24, "R'(OCH$_2$CH$_2$)$_M$" should read --R'(OCH$_2$CH$_2$)$_m$--.
Col. 4, line 30, "R'(OCH$_2$CH)$_m$" should read --R'(OCH$_2$CH$_2$)$_m$--.
Col. 4, line 36, "dilute by" should read --diluted by--.
Col. 4, line 61, "n-C$_{10}$-H$_{21}$SO$_3$$^1$" should read --n-C$_{10}$-H$_{21}$SO$_3^-$ --.
Col. 4, line 62, "C$_{10}$-C$_{15}$SO$_3$$^1$" should read --C$_{10}$-C$_{15}$SO$_3^-$ --.
Col. 4, line 65, "(OCH$_2$CH$_2$$_3$OSO$_3$$^1$" should read --(OCH$_2$CH$_2$)$_3$OSO$_3^-$ -
Col. 4, line 70, "diethyl" should read --dimethyl--.
Col. 4, line 73, "alklolamide" should read --alkylolamide--.
Col. 5, line 17, "preferred" should read --prepared--.
Col. 5, line 20, "of agent" should read --of the agent--.
Col. 5, line 28, "shunt" should read --shut--.
Claim 7, line 3, "mixture" should read --mixtures--.
Claim 16, line 7, "10 parts of the solution" should read
         --10 parts per 100 parts of the solution--.

Signed and sealed this 25th day of April 1972.

(SEAL)
Attest:

EDWARD M.FLETCHER,JR.      ROBERT GOTTSCHALK
Attesting Officer          Commissioner of Patents